Patented May 26, 1942

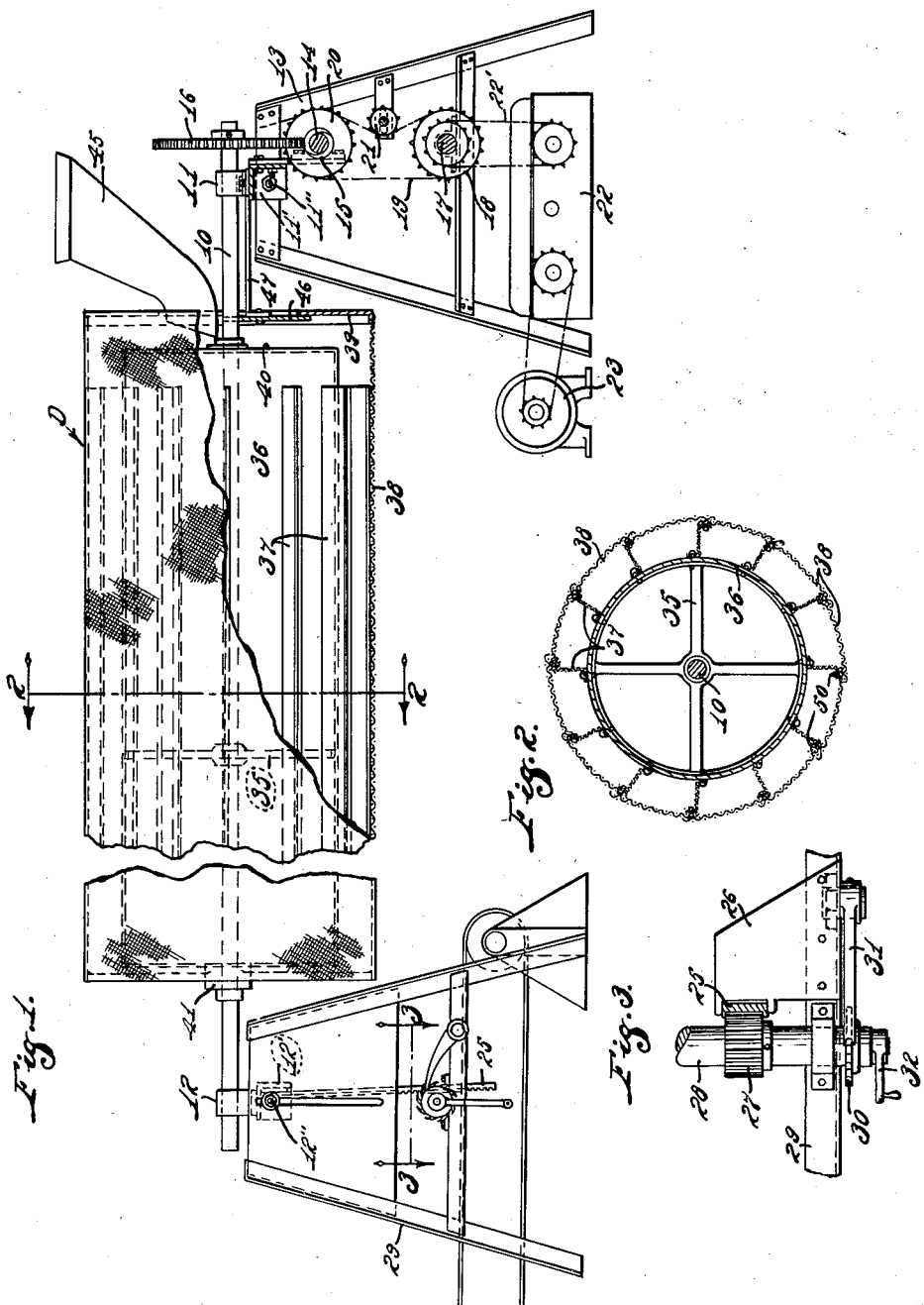

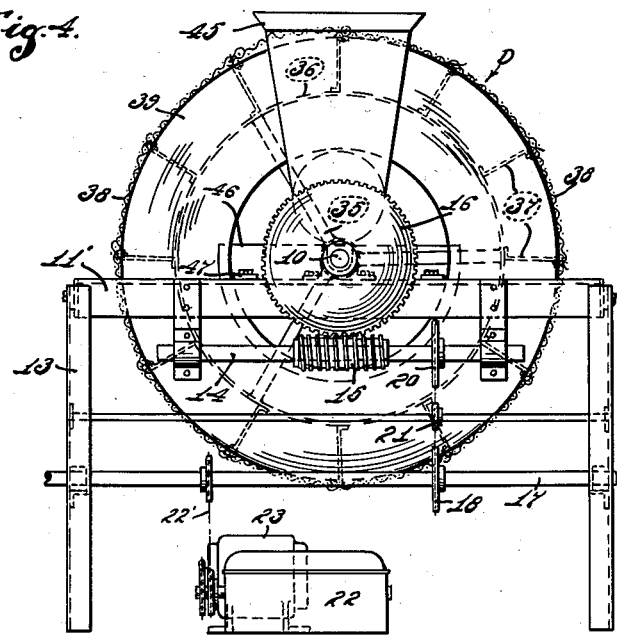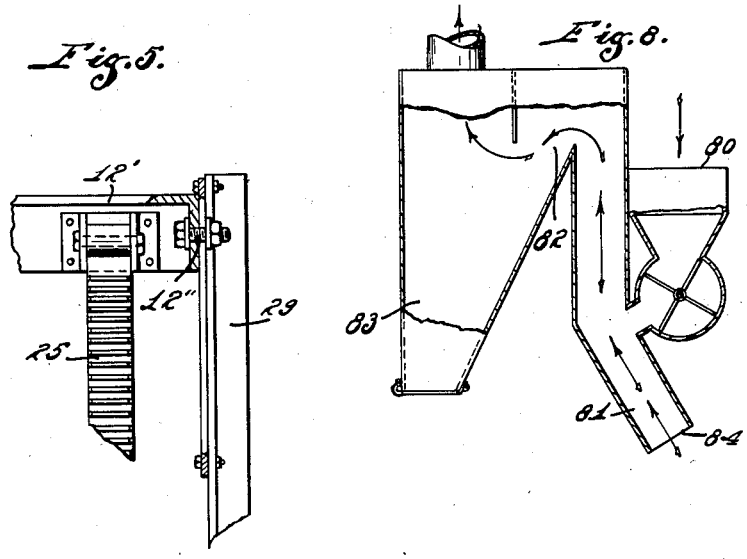

2,284,270

UNITED STATES PATENT OFFICE 2,284,270

METHOD AND APPARATUS FOR GRADING AND INDIVIDUALLY FREEZING VARIOUS ARTICLES

Edward C. Eberts and Kenneth M. Eberts, Indianapolis, Ind.; said Edward C. Eberts assignor to Stokely Brothers & Company, Inc., Indianapolis, Ind., a corporation of Indiana Application December 24, 1938, Serial No. 247,652

7 Claims. (Cl. 62—102)

At the present time there are three well known methods of quick-freezing peas and lima beans for the packaged frozen food market. In the practice of one of these methods, the peas or beans, after blanching, are placed in measured quantities, in containers, the containers sealed and then subjected to the desired freezing temperature. As a result of that method the peas or beans reach the consumer as a frozen cake with the particles externally frost coated and sticking together. If the consumer desires to utilize less than the complete contents of the package without destruction of the frozen condition, it is necessary to break the cake and this result in breakage of a considerable number of beans and lack of accuracy of apportionment. Otherwise, it is necessary to thaw out the cake, whereupon the remnant, not immediately used, must be used within a comparatively short time before deterioration occurs.

Another method involves a preliminary spreading of comparatively thin layers of beans in sieve-like trays, whereupon the beans are frozen in a cake two or three beans thick, whereupon the cake is broken up mechanically and the frozen beans packaged. Here, again, the particles are frozen together in a cake and are covered with frost. The requisite breaking for packaging inevitably results in a considerable breakage of otherwise whole beans, but the loss entailed by this breakage is not so great as the additional production cost which would be involved in freezing a single layer of beans, especially in view of the fact that the freezing of a layer of beans even in a sieve-like tray results in a considerable sticking of beans to the tray bottom and breakage occurs in removing the frozen beans from the trays.

According to another method, similar to the tray method already described, the material is carried as a layer on an endless belt through a refrigerating chamber. Here, also, the particles are heavily frost covered and many must be so forcibly separated from the belt as to result in breaking, resulting either in deterioration of the grade of the product or requiring the added cost of removal of damaged particles.

In the practice of any of these methods, it is quite essential that the supply be carefully picked over by hand in order to remove defective beans, broken beans, hulls, and foreign matter.

Peas, and especially lima beans, are quite fragile, especially after they have been blanched, and the practice of either of the above-described methods for freezing such articles has entailed considerable expense, largely because of the apparently unavoidable breakage and abrasion of perfectly good peas or beans and, of course, this cost of manipulation is unavoidably reflected in the retail selling price.

The primary object of our invention primarily is to provide an improved method and apparatus by which peas, lima beans, or other flowable comestibles (not liquids), may be frozen as individual non-adherent particles without the necessity of preliminary separation so that the necessary grading can be subsequently cheaply accomplished and a much larger proportion of whole commercially acceptable peas or beans may be packaged as frozen entities in such condition that they will not be frost coated but, instead, will have a polished appearance and may be readily poured from the package by the consumer without breakage.

When the invention is clearly understood it will be readily recognized that it, or various portions of it, may be utilized for mere grading or for individualized freezing without grading, or for simultaneous grading and individualized freezing of streams of various particles.

The accompanying drawings illustrate our improved apparatus.

Fig. 1 is a side elevation in partial vertical section of the primary drum and its supporting and driving mechanism;

Fig. 2 is a section on line 2—2 of Fig. 1;

Figure 6:
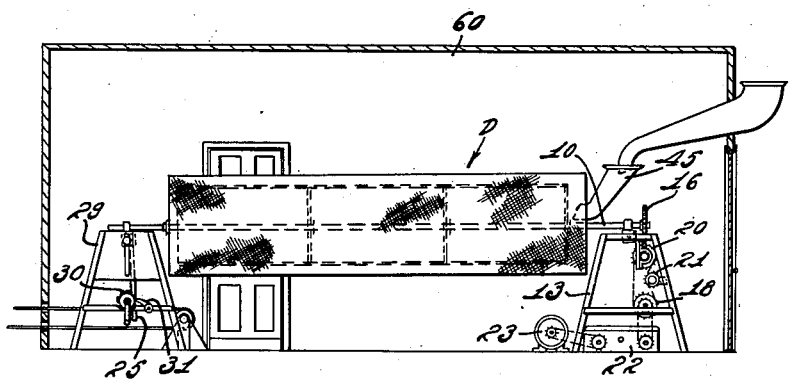
Figure 7:
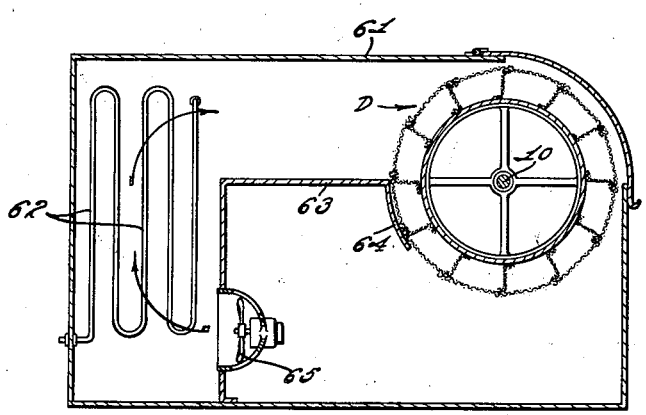

Fig. 3, a fragmentary section on line 3—3 of Fig. 1;

Fig. 4 an end elevation;

Fig. 5 a fragmentary detail of a part of a mechanism for adjusting the inclination of the primary drum;

Fig. 6 an elevation, on a smaller scale, of the apparatus shown in Fig. 1 within a refrigerating chamber shown in vertical section;

Fig. 7 a transverse section, on a smaller scale, and largely diagrammatic in character of the primary drum, with an associated refrigerator and air circulation means; and Fig. 8 a diagrammatic illustration of a well known separating device which may be used for mechanically separating the commercially acceptable frozen entities from the unacceptable frozen particles.

In the drawings 10 indicates a substantially horizontal shaft supported by bearings 11 and 12 which are supported, respectively, by rockable supports 11' and 12' pivoted upon transverse horizontal axes 11" and 12". The axis 11" is carried at the upper end of a frame 13. Journalled on support 11' is a shaft 14 provided with a worm 15 which meshes with worm gear 16 secured to shaft 10.

Journalled on frame 13 is a shaft 17 carrying a sprocket 18 which is connected by a loose chain 19 with a sprocket 20 carried by shaft 14, the slack in said chain being taken up by an idler 21 journalled on frame 13 so that sprocket 20 may be swung through a small angle about the axis 11'' without interfering with the driving connection between shafts 17 and 14.

Shaft 17 is driven, through any suitable driving train 22', which preferably includes a speed varying transmission 22 from a motor 23. Motor 23 and transmission 22 may be placed in the refrigerating chamber, to be described later, or, preferably, at a point outside of said chamber.

Support 12' is supported at its opposite ends by a rack 25 guided by guide 26 and meshing with a pinion 27 on a shaft 28 journalled in frame 29. Shaft 28 is provided with a ratchet 30 engaged by a pawl 31 on frame 29 and the shaft may be rotated by means of a hand crank 32 so that, by vertically adjusting the racks 25, bearing 12 may be vertically adjusted so as to adjust the angle of the inclination of shaft 10.

Shaft 10 carries spiders 35, 35 which support an internal drum 36 which is preferably, although not necessarily, imperforate and carries externally a plurality of outwardly extending radial partitions 37 which are conveniently formed of wire screen having a mesh too small to permit passage therethrough of the articles to be manipulated. Secured to the outer ends of partitions 37 is the shell 38 which, in one form of our apparatus, may be of uniform mesh too fine to permit passing of desired articles therethrough but such as to permit air circulation and form an external drum serving to retain definite quantities of articles in the longitudinally extending pockets formed between adjacent partitions 37 and adjacent portions of the inner drum 36 and the outer drum 38. Spaced from one end of the drum 36 is an inwardly extending annular flange 39. One end of the inner drum 36 is closed by a plate 40. The other end of the inner drum 36 may be either open or closed and the other end of the outer drum 38 is open, this other end, if desired, being supported by a spider 41 which will not interfere with the gravity discharge of the material at this end of the outer drum.

The parts 35 to 40, inclusive, form an integral rotary structure which will hereafter be referred to as drum D.

Projected into the eye of the annular flange 39 is a feed spout 45 so arranged that articles, such as peas, lima beans, etc., may be discharged into the receiving end of the outer drum 38 and, in order to prevent such articles from rebounding from the closure 40 back through the eye of the flange 39, the lower portion of said eye is blocked by a semi-annular plate 46 carried by a support 47 mounted on support 11'.

The screen 38 may conveniently be formed in sections extending longitudinally of the drum and between adjacent partitions 37 and, as indicated in Fig. 2, each of these sections may be hinged at 50 to the outer end of one partition with a width sufficient to overlap the hinge of the adjacent section, the free edges of these screens being secured in normal position by any suitable fastening means which may be readily manipulated to permit swinging of any one of the screen sections to afford access to the compartment formed between the two adjacent partitions.

If grading is desired, other than removal of frost to be described later, the screens forming drum 38 are arranged longitudinally of the drum D in sections of desired length less than the total overall length of the drum and of successively larger mesh so that discharges of particles of various sizes, beginning with the finer, may occur at predetermined points in the length of the drum.

In order to accomplish quick freezing of articles delivered to drum D said drum may be placed in a refrigerated chamber 60 in which a desired low temperature is maintained, say somewhere in the neighborhood of −20 to −30 degrees F. To facilitate the freezing operation, the drum D may be encased in a casing 61 having refrigerator coils 62 and intermediate horizontal partition 63 with a short arcuate extension 64 having an annular extent a little greater than the angle between the two partitions 37, and an air circulating fan 65, the arrangement being such that the refrigerated air may be blown laterally across the upper region of drum D and the warmer air drawn laterally from the lower region of drum D through the eye of fan 65 over the coil 62 and back to the upper region of the drum.

By driving the refrigerating air transversely of the general direction of travel of the streams of particles through the drums, the extent of travel of any particular small volume of air over the particles is comparatively small and hence a high efficiency of refrigeration is maintained, as distinguished from the effect resulting in a circulation of the refrigerating air axially of the apparatus.

In operation, and assuming for the moment that the screens forming drum 38 are of uniform mesh, articles such as peas or lima beans, having been previously blanched by any well known method, are delivered through spout 45 into the receiving end of the rotating drum D, said drum having been given a sufficient pitch so that adequate freezing time will be consumed by the passage of the articles lengthwise through the drum.

We have found that it is not necessary to separate broken or imperfect particles or hulls from the aggregate, as has heretofore been considered commercially necessary. As the drum rotates, relatively small quantities of the incoming beans will pass into the compartments between partitions 37 as they are successively carried through their lowermost positions and the rate of delivery from spout 45 is preferably so controlled that the volume of beans in one compartment will not greatly exceed about one-third the capacity of the compartment. As the drum rotates, the beans will roll back upon the trailing partition while the trailing partition is proceeding toward its horizontal position. Further rotation of the drum will cause the beans to roll upon themselves toward the drum 36 so that, as this particular compartment reaches its uppermost position, the beans will have been distributed fairly evenly over drum 36. Further onward movement of the drum permits the beans to roll downwardly over the surface of the drum 36 on to the leading partition and, as this compartment again reaches its lowermost position, the beans will roll over the inner surface of the outer drum 38. Due to the downward inclination of the drum D the beans will progress slowly lengthwise of the drum and, during successive rotations of the drum, the beans in any one compartment will be repeatedly rolled upon and submerge each other and caused to traverse successively the inner surface of drum 38, the trailing partitions, the outer surface of drum 36, and the leading partitions, and during their progress through the apparatus they will be individually frozen. The freezing operation causes, or tends to cause, the formation of frost on the particles and, in the absence of preliminary surface drying, this is quite considerable and disfiguring. In the practice of our method, however, the particles, as they progress, rub each other and rub over the several screens so that there is an elimination of surface frost and, instead, a production of polished surfaces which not only have a very attractive appearance but apparently have much less tendency to stick together than do frosted surfaces.

We have found that the described traverse of the beans not only prevents the whole beans from sticking together as they are being frozen, but also prevents broken beans and hulls from sticking together or sticking to the whole beans so that individualized frozen particles emerge from the discharge end of the drum where they fall upon a conveyor 70 by which they are conveyed from the refrigerating chamber.

This definite individualization of particles is of the greatest importance in reducing the production cost of packaged frozen foods.

The aggregate of frozen individualized beans may now be readily graded and separated by delivering a stream of them to a separator of the air blast type, of well known construction, not usable with particles frozen by previous methods. This results in a material reduction in cost of production. Referring to Fig. 8, the individualized frozen particles drop downwardly at 80 against an upwardly delivered freezing air stream 81 which finds outlet through throat 82 so that lighter particles, such as hulls and broken beans, are carried by the air blast out through throat 82 to fall into chamber 83 while the whole beans drop through the discharge opening 84.

Considered solely as a grading apparatus where screens 38 are arranged as annular screens in longitudinal series of different meshes, it will be noted that, because of the relatively small volumes of particles between adjacent partitions 37, the rolling traverse of these small volumes successively over the inner surface of the screen, the trailing partitions, and a return to the inner surface of the screen, insures such an agitation of the individual constituents of these small volumes and a traverse thereof across the screen that direct contact of each particle with the screen is insured within a comparatively short distance in the general direction of travel, so that all particles, of a size less than the screen mesh, pass quickly through the screens.

With screens of different meshes arranged as described, the effluent through the various screens, may be readily caught and carried away by any suitable transfer mechanism readily provided by any average mechanic.

It will be noted that the particles are given a spiral planetary movement about the axis of the drum, and during alternate one-half revolutions, each particle moves inwardly toward the planetary axis and during alternate other half revolutions each particle moves outwardly away from the planetary axis, and that particles which at one time are submerged become submerging particles at the next half turn of the drum. Each particle of the treated stream therefore moves in a radially-undulatory spiral path about the planetary axis, the particles thus rolling over, and relative to, each other, so that, as freezing progresses, a frozen bond between adjacent particles is prevented and surface frosting is eliminated.

It will also be noted that, because of the particle confinement due to the presence of the circumferentially spaced partitions and the connecting inner drum, the movement of the particles is a supported tumbling or rolling with an entire absence of free falling. This is quite important in the treatment of delicate easily-bruised articles such as blanched peas, and lima beans, strawberries, etc.

Considering a cross section of one of the troughs, it will be noted that the trough forms a closed figure, two sides of which lie at substantial angles to the two adjacent sides, and which is rotated about an axis which extends lengthwise of the axis of the closed figure, and that the mass of particles successively traverses the sides of the closed figure. Particles which are in direct contact with a supporting side either slide or roll until obstructed by the next side, whereupon the uppermost particles roll over and submerge the obstructed particles and are themselves obstructed so that the previously obstructed particles are brought into position where they can roll over and submerge the subjacent particles. This action of turbulation continually prevents sticking of one particle to another during the freezing operation.

In view of the fact that, as a result of the practice of our method and use of our apparatus, an aggregate is obtained of individualized frozen particles which do not stick together as they emerge from the apparatus, the aggregate may be successfully subjected to an air blast to separate the hulls, broken particles, etc., at an expense far below that involved in the hand separation which has heretofore been practiced and considered as an essential step preliminary to freezing. This capability resulting from the practice of our invention, has contributed materially to reduction of cost of production of the frozen aggregate.

Attention is also called to the fact that, as the frozen aggregate comprises individualized frozen particles, the frozen aggregate is readily pourable and consequently existing machines commonly used in food packaging plants for packing non-frozen flowable solids may be used for packaging our flowable frozen aggregate, so that the expense of design and construction of special packaging machinery for frozen products, and the necessary floor space therefor, is avoided.

It is well known that deterioration of the vitamin C content of blanched peas, lima beans, etc., is fairly rapid and that this deterioration may be arrested either by sufficient heating or freezing. In the freezing methods heretofore practiced on peas, lima beans, etc., a considerable proportion has been blanketed by another quiescent proportion through which the heat of the blanketed proportion had to be conducted before the blanketed proportion could become reduced to the temperature at which vitamin C deterioration is arrested. It will be noted that in the practice of the preferred form of our invention, the freezing air current moves transversely of the general line of travel of each aggregate stream; that each of these streams is of limited width and depth; and that the individual particles of each stream are caused to repeatedly emerge to the surface of the stream and to repeated contact with the perforate walls which define each stream, this contacting occurring first while the contacting particle is not submerged and continuing after submergence, so that the transversely moving air current is intimately associated with each individual particle while the air stream is at its coldest. Consequently each particle of the stream becomes frozen at the earliest possible moment and a frozen aggregate is obtained which is uniform as to its vitamin C conntent.

If desired, the articles to be treated may be surface dried, by an air blast or by treatment set forth in Patent 1,964,429, thus reducing frosting of the refrigerating coils.

We claim as our invention:

1. The method of freezing food stuffs which comprises the steps of: establishing a flowing stream of such food stuffs, revolving said stream as a whole about an inclined axis outside of the stream but in the general direction of flow of the stream, supporting said stream during such revolution as a loose aggregate of the food stuffs in such manner that as a result of said revolution the particles of the stream will contactively intermingle by gravity flow crosswise of the general line of the stream flow, and subjecting the relatively moving and contacting particles to a refrigerant having a temperature below the freezing temperature of the particles until the particles are frozen as individuals.

2. The method of freezing food stuffs which comprises the steps of: establishing a flowing stream of such food stuffs, revolving said stream as a whole about an inclined axis outside of the stream but in the general direction of flow of the stream, supporting said stream during such revolution as a loose aggregate of the food stuffs in such manner that as a result of said revolution the particles of the stream will contactively intermingle by gravity flow crosswise of the general line of the stream flow, and subjecting the moving particles of the stream to a crosswise gaseous stream at a temperature below the freezing point of the particles.

3. The method of freezing food stuffs which comprises the steps of: establishing a flowing stream of such food stuffs, revolving said stream as a whole about an inclined axis outside of the stream but in the general direction of flow of the stream, supporting said stream during such revolution as a loose aggregate of the food stuffs in such manner that as a result of said revolution the particles of the stream will contactively intermingle by gravity flow crosswise of the general line of the stream flow, subjecting the relatively moving and contacting particles to a refrigerant having a temperature below the freezing point of the particles until the particles are externally frozen as individuals, and the step of withdrawal of finer particles from coarser particles by gravity movement of said finer particles crosswise from the stream.

4. The method of freezing food stuffs which comprises the steps of: establishing a flowing stream of such food stuffs, revolving said stream as a whole about an inclined axis outside of the stream but in the general direction of flow of the stream, supporting said stream during such revolution as a loose aggregate of food stuffs in such manner that as a result of said revolution the particles of the stream will contactively intermingle by gravity flow crosswise of the general line of the stream flow, subjecting the moving particles of the stream to a crosswise gaseous stream at a temperature sufficiently below the freezing point of the particles to externally freeze the particles promptly following the time of their entry into said gaseous stream, and the step of withdrawal of finer particles from coarser particles by gravity movement of said finer particles crosswise from the stream.

5. The method of treating food stuffs which comprises the steps of: establishing a flowing stream of such food stuffs, revolving said stream as a whole about an inclined axis outside of the stream but in the general direction of the flow of the stream, supporting said stream during such revolution as a loose aggregate of the food stuffs in such manner that as a result of said revolution the particles of the stream will contactively intermingle by gravity flow crosswise of the general line of stream flow, subjecting the relatively moving particles to a gaseous medium having a temperature substantially different from the food stuff particles at the beginning of treatment to effect heat transfer between said medium and particles whereby said particles are modified by the heat interchange, and the step of withdrawal of finer particles from coarser particles by gravity movement of said finer particles crosswise from the stream.

6. Apparatus for maintaining individualism of flowable edible particles, such as peas and lima beans, during freezing, comprising a recumbent perforate drum arranged to rotate about its axis and having an inlet at one end and an outlet at its other end, a plurality of perforate partitions extending axially of said drum and projecting inwardly thereof and arranged in said drum to cooperate therewith to form a cylindrical series of troughs, means extending axially of the drum and closing the inner sides of said troughs, whereby independent streams of flowable particles are established, and means for producing a flow of freezing air currents transversely of the axis of said drum and through said streams.

7. Apparatus of the character specified in the immediately preceding claim wherein successive longitudinally spaced areas of the drum are provided with perforations of greater size than the perforations of the immediately preceding area.

EDWARD C. EBERTS.
KENNETH M. EBERTS.